Figure 1:
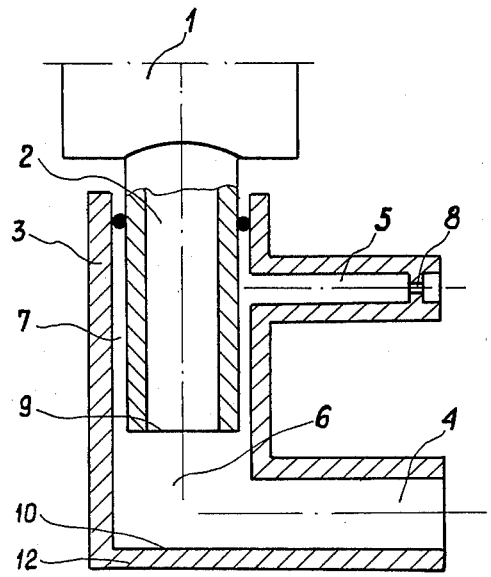

United States Patent [19]
Kolodziejski et al.

[11] 4,389,897
[45] Jun. 28, 1983

[54] IMPELLER FLOW-METER PULSATION DAMPING

[75] Inventors: Stanisław Kolodziejski; Stanisław Dwojak; Andrzej Grabowski, all of Warsaw, Poland

[73] Assignee: Przemyslowy Instytut Automatyki i Pomiarow "MERA-PIAP", Warsaw, Poland

[21] Appl. No.: 252,227

[22] Filed: Apr. 8, 1981

[30] Foreign Application Priority Data

Apr. 16, 1980 [PL] Poland ................................ 223527

[51] Int. Cl.³ .............................................. G01F 1/00
[52] U.S. Cl. ...................................... 73/861; 73/114; 73/707
[58] Field of Search ............... 73/119 A, 861, 861.77, 73/861.78, 861.79, 861.81, 861.82, 861.83, 114, 113, 707; 138/40, 42

[56] References Cited

U.S. PATENT DOCUMENTS

| | | | |
|---|---|---|---|
| 2,210,480 | 8/1940 | Brice | 73/707 X |
| 2,749,752 | 6/1956 | Gehre | 73/861.82 |
| 3,867,840 | 2/1975 | Baatz | 73/229 |
| 4,092,850 | 6/1978 | Erwin, Jr. | 73/113 |

Primary Examiner—Jerry W. Myracle
Attorney, Agent, or Firm—Ladas & Parry

[57] ABSTRACT

The subject matter of the invention is an impeller flow-meter, particularly for accurate measurement of the flow rate of liquid fuel fed to an internal-combustion engine.

In the flow-meter according to the invention, an impeller chamber (1) is provided with an inlet pipe (2), surrounded coaxially by an ante-chamber (3). A supply pipe (4) is provided for the liquid fuel and an offtake pipe for excess fuel, these pipes being situated in different planes along the axis of ante-chamber (3). A space (6) is located between the entrance end of inlet pipe (2) and the exit end of supply pipe (4). A slot (7) is formed between the outer wall of inlet pipe (2) and the inner wall of the coaxial ante-chamber (3). The slot (7) communicates with space (6) and offtake pipe (5). As a result of this structure, pulsations in the liquid supply, which would affect the impeller accuracy, are substantially extinguished in space (6) before reaching the impeller chamber (1).

9 Claims, 2 Drawing Figures

IMPELLER FLOW-METER PULSATION DAMPING

The subject matter of the present invention is an impeller flow-meter, particularly for accurately measuring the rate of flow of the liquid fuel fed to an internal-combustion engine.

Impeller flow-meters having an impeller situated in an impeller chamber to which a liquid is supplied, whose rate of flow is being measured, are very sensitive to pulsations of a stream of the liquid. Pulsations of the stream have a substantial effect on the accuracy of the flow-meter. The phenomenon of pulsation appears especially important in fuel feed systems of internal-combustion engines. Two types of feed systems for internal-combustion engines are used nowadays. The most common feed system is a system without a drain, wherein any excess of fuel supplied by the fuel pump remains in fuel pipes between the pump and the carburetor. The measurement of the flow rate of the liquid in such a system by means of flow-meters in which the liquid is supplied directly to the impeller chamber is subject to considerable error. The other feed system for internal-combustion engines, is a system with a drain, wherein any excess of fuel supplied by the fuel pump is drained to a storage tank. In the said other second system which is increasingly used in modern automotive vehicles, offtake pipes draining the excess of fuel are provided with constricting glands. Due to this, pulsation of the stream of the liquid is reduced, and thus the accuracy of the measurement of the flow rate of the liquid increases. However, this increase of the accuracy, obtained due to glands situated in the offtake pipes for the excess of the liquid, is not fully satisfactory. Considerable errors affecting measurements of the flow rate of the liquid in feed systems of internal-combustion engines cause the result that the hitherto applied instruments for measuring the amount of fuel consumed by the internal-combustion engine, and especially instruments for measuring an instantaneous fuel consumption per unit of the distance covered, are subject to considerable error and for this reason they function as indicators and not as measuring instruments. For these reasons they also have not found a wider application in the motor transport, despite the fact that the necessity of economical handling of fuels requires a continuous control of the fuel consumption in internal-combustion engines.

The present invention is applied to said second type of system above referred to comprising an impeller flow-meter for measuring the flow rate of a liquid impelled therethrough, in which a rotary impeller is located in an impeller chamber, the liquid is supplied through a supply pipe and an inlet pipe to said chamber and excess fluid not impelled through the meter is removed by an offtake pipe, the rotational rate of the impeller being utilized to determine the flow rate of the liquid, for example, by a conventional electric circuit converting impeller rotations to a signal proportional to the liquid flow rate.

In accordance with the invention, an improvement to said impeller flow-meter is provided, particularly for accurately measuring the flow rate of liquid fuel in an internal combustion engine, which improvement comprises incorporating in said flow-meter the following features:

(a) an ante-chamber is provided connected to the supply pipe and to the offtake pipe;

(b) said ante-chamber has an upper portion thereof mounted externally of and coaxially with the inlet pipe to provide an annular slot therebetween, permitting passage of liquid between the outerwall of the inlet pipe and the inner wall of the ante-chamber;

(c) the offtake pipe is in communication with said slot; and (d) the supply pipe is in communication with a space within said ante-chamber below said upper portion.

As a result, pulsations in the liquid supply from the supply pipe which would affect the rotational rate of the impeller, damped and extinguished before the liquid reaches the impeller chamber through the inlet pipe.

The inlet pipe and the offtake pipe of the ante-chamber are situated in different planes perpendicular to said ante-chamber and displaced along its axis, whereby the offtake pipe is located adjacent said slot, and the supply pipe is located adjacent the space formed between the entrance end the inlet pipe of the impeller chamber and the bottom of the ante-chamber. The ante-chamber is mounted snugly on the inlet pipe of the ante-chamber, so that it can rotate. In the offtake pipe of the ante-chamber a constricting gland is located. The supply pipe of the ante-chamber can be situated in its frontal wall. For the purpose of better fixing the ante-chamber on the inlet pipe of the impeller chamber, the said inlet pipe has a retainer ring whose outer diameter is equal to the inner diameter of the ante-chamber. In order to enable the flow of the liquid through the slot to the offtake pipe of the ante-chamber, at the place of contact between the outer wall of the retainer ring and the inner surface of the ante-chamber, the inner wall of the latter is provided with recesses. Recesses enabling the flow of the liquid through the slot can be made in the retainer ring. The impeller chamber and its inlet pipe can be joined integrally.

Due to the use of the ante-chamber a high degree of accuracy of the flow rate of the liquid is rendered possible. This results from the fact that the stream of the liquid is damped down and its pulsation is completely extinguished.

Figure 2:
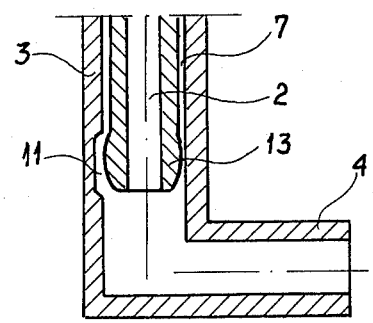

The subject matter of the invention is presented in the accompanying drawing, wherein FIG. 1 shows a longitudinal section of the flow-meter according to the invention, and FIG. 2 shows a longitudinal section of a portion of the flow-meter with a retainer ring on the inlet pipe of the impeller chamber.

The flow-meter has an impeller chamber 1 in which an impeller is situated, which is not shown in the drawing. The impeller chamber 1 has an inlet pipe 2 which can be integrally joined therewith. On the inlet pipe 2 an ante-chamber 3 is mounted co-axially and snugly but so that it can rotate, said ante-chamber having a supply pipe 4 and an offtake pipe 5 communicating with an annular slot 7 formed between the inner wall of the ante-chamber 3 and the outer wall of the inlet pipe 2 of the impeller chamber 1. In the offtake pipe 5 a constricting gland 8 is situated. Between the bottom 10 of the ante-chamber 3 and the entrance end 9 of the inlet pipe 2 a space 6 is formed, communicating with the inlet pipe 4 and to which a liquid is supplied, whose flow rate is being measured. The inlet pipe 4 and the offtake pipe 5 of the ante-chamber 3 are situated in different planes displaced along the axis of the ante-chamber 3 and perpendicular to said axis. The supply pipe 4 can be situated in the frontal wall 12 of the ante-chamber 3. The inlet pipe 2 of the impeller chamber 1 can be provided with a retainer ring 13 whose outer diameter is equal to the inner diameter of the ante-chamber 3. In this case, instead of contact between the outer surface of the retainer ring 13 and the inner surface of the ante-chamber 3 the inner wall of the latter is provided with recesses 11 rendering possible the flow of the liquid. These recesses can be made also in the retainer ring 13.

The liquid is fed by the supply pipe 4 to the space 6 of the ante-chamber 3. In said space the stream of the liquid is damped down and the pulsation thereof is extinguished. A part of the stream of the liquid is fed by the inlet pipe 2 to the impeller chamber 2 wherein it drives the impeller, and then it is taken off to a receiver which can be, for example, the carburettor of an internal-combustion engine. The part of the stream of the liquid, which is not collected by the receiver, is drained through the slot 7 and the offtake pipe 5 to a storage tank.

As has been proved in tests, the measurement of the flow rate by means of the flow-meter according to the invention is characterized by a very high accuracy. For this reason flow-meters of this type can be used for measurements of and accounting for amounts of the fuel consumed by internal-combustion engines of automotive vehicles as well as by stationary engines.

What is claimed is:

1. In an impeller flow-meter for measuring the flow rate of a liquid impelled therethrough, including an impeller chamber for a rotary impeller, a supply pipe for the liquid and an inlet pipe to said chamber, and an offtake pipe for removing excess liquid not impelled through the meter, the flow rate of the liquid being determined by the rotational rate of the impeller, the improvement which comprises, particularly for accurately measuring the flow rate of liquid fuel in an internal combustion engine, incorporating in said flow-meter the following features:
   (a) an ante-chamber (3) is provided connected to said supply pipe (4) and to said offtake pipe (5);
   (b) said ante-chamber (3) has an upper portion thereof mounted externally of an coaxially with the inlet pipe (2) to provide an annular slot (7) therebetween, permitting passage of liquid between the outer wall of the inlet pipe (2) and the inner wall of the ante-chamber (3);
   (c) said offtake pipe (5) is in communication with said slot (7); and
   (d) said supply pipe (4) is in communication with a space (6) within said ante-chamber (3) below said upper portion;
whereby pulsations in the liquid supply from the supply pipe (4), which would affect the rotational rate of the impeller, are damped and extinguished before the liquid reaches the impeller chamber (1) through the inlet pipe (2).

2. A flow-meter according to claim 1, in which said supply pipe (4) and said offtake pipe (5) are situated in different planes vertically displaced along the axis of the ante-chamber (3), so that the end of said offtake pipe (5) enters said slot (7) and the end of said supply pipe (4) enters said space (6) formed between the end of inlet pipe (2) and the bottom (10) of ante-chamber (3).

3. A flow-meter according to claim 1, characterized in that in the offtake pipe (5) of the ante-chamber (3) a constricting gland (8) is located.

4. A flow-meter according to claim 1, characterized in that the ante-chamber (3) is mounted on the inlet pipe (2) of the impeller chamber (1) snugly but so that it can rotate.

5. A flow-meter according to claim 1, characterized in that the supply pipe (4) of the ante-chamber (3) is situated in its frontal wall (12).

6. A flow-meter according to claim 1, characterized in that the inlet pipe (2) of the impeller chamber (1) has a retainer ring (13) whose outer diameter is equal to the inner diameter of the ante-chamber.

7. A flow-meter according to claim 6, characterized in that at the place of contact between the outer surface of the retainer ring (13) and the inner surface of the ante-chamber (3) the inner wall of the latter is provided with recesses (11) rendering possible the flow of the liquid.

8. A flow-meter according to claim 6, characterized in that the recesses enabling the flow of the liquid are provided in the retainer ring (13).

9. A flow-meter according to claim 1, characterized in that the impeller chamber (1) and its inlet pipe (2) are integrally joined.

* * * * *